(12) United States Patent
Aoyama et al.

(10) Patent No.: US 7,854,250 B2
(45) Date of Patent: Dec. 21, 2010

(54) CONTROL VALVE BODY OF AUTOMATIC TRANSMISSION AND MANUFACTURING METHOD THEREFOR

(75) Inventors: Toshihiro Aoyama, Susono (JP); Shinichi Itou, Susono (JP); Akira Murakami, Gotenba (JP); Tomoyasu Kitano, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 776 days.

(21) Appl. No.: 11/596,845

(22) PCT Filed: May 12, 2005

(86) PCT No.: PCT/JP2005/009114

§ 371 (c)(1),
(2), (4) Date: Nov. 17, 2006

(87) PCT Pub. No.: WO2005/113177

PCT Pub. Date: Dec. 1, 2005

(65) Prior Publication Data

US 2008/0061262 A1    Mar. 13, 2008

(30) Foreign Application Priority Data

May 20, 2004  (JP) .............................. 2004-150931

(51) Int. Cl.
*B22D 17/00*  (2006.01)
(52) U.S. Cl. ....................................... 164/113; 164/312
(58) Field of Classification Search ................. 164/113, 164/312
See application file for complete search history.

(56) References Cited

U.S. PATENT DOCUMENTS 4,489,771 A * 12/1984 Takeshima et al. .......... 164/305
4,779,323 A * 10/1988 Bloemendaal ................ 29/434

(Continued)

FOREIGN PATENT DOCUMENTS

DE        42 23 578        1/1994

(Continued)

OTHER PUBLICATIONS

Supplementary European Search Report dated Jan. 2, 2008.

(Continued)

*Primary Examiner*—Kuang Lin
(74) *Attorney, Agent, or Firm*—Finnegan, Henderson, Farabow, Garrett & Dunner, LLP (57) ABSTRACT

By pouring, by means of pressure, melted liquid of magnesium or magnesium alloy into a hollow portion which is formed using a casting mold, a valve body where a channel groove for hydraulic oil for use in a speed change operation of the automatic transmission is formed. In the above, the channel grove for the hydraulic oil is formed due to a convex portion which is formed on the mold so as to project into the hollow portion. As the magnesium has small heat capacity, variation of the temperature of the mold during the cooling and heating cycle can be suppressed. Moreover, as the magnesium melted liquid has no reactivity with respect to the casting mold, the convex portion is not deteriorated. This allows employment of a mold having a thinner convex portion formed thereon, and therefore formation of a valve body having a narrower channel groove.

2 Claims, 5 Drawing Sheets

U.S. PATENT DOCUMENTS

| | | | |
|---|---|---|---|
| 5,749,563 A * | 5/1998 | Hosaka et al. | 123/568.29 |
| 2001/0002618 A1 * | 6/2001 | Hosoi et al. | 164/113 |
| 2004/0089355 A1 | 5/2004 | Nirasawa et al. | |

FOREIGN PATENT DOCUMENTS

| | | |
|---|---|---|
| DE | 602 22 861 | 1/2008 |
| EP | 1 097 768 A1 | 5/2001 |
| JP | 10-238628 | 9/1998 |
| JP | 11-124692 | 5/1999 |
| JP | 2000-320502 | 11/2000 |
| JP | 2001-280457 | 10/2001 |
| JP | 3286224 | 3/2002 |

OTHER PUBLICATIONS

English translation of Excerpt from Opinion of the International Searching Authority, Nov. 17, 2006.

Opposition to European patent No. EP 1 764 172 by ZF Friedrichshafen AG, dated Apr. 19, 2010.

Enclosure 3 attached to EPO Communication dated Jun. 10, 2010; Section 307-01 Automatic Transmission/Transaxle, Description and Operation Manual (Dec. 2001).

Enclosure 5 attached to EPO Communication dated Jun. 10, 2010; Zeichnungen Ventilgehäuse Roh-und Fertigteil (drawings) dated May 8, 2000.

Enclosure 6 attached to EPO Communication dated Jun. 10, 2010; Auszug Giesserei Lexikon ISBN 3-7949-0655-1, p. 451 (2000).

Communication of a Notice of Opposition dated Jun. 10, 2010, for EP Patent No. 1764172.

Enclosure 1 attached to EPO Communication dated Jun. 10, 2010; Frachtbrief Nr. 460968, dated Jun. 6, 2003.

Enclosure 2 attached to EPO Communication dated Jun. 10, 2010; Auflistung Stückzahlen (email from D. Hemmerling to J. Schmidt), dated Mar. 10, 2010.

Enclosure 4 attached to EPO Communication dated Jun. 10, 2010; Stückliste 6HP26 1.068.012.150 dated Apr. 16, 2010.

* cited by examiner

CONTROL VALVE BODY OF AUTOMATIC TRANSMISSION AND MANUFACTURING METHOD THEREFOR

TECHNICAL FIELD

The present invention relates to a control valve body of an automatic transmission, in which a channel groove for hydraulic oil for use in a speed change operation of the automatic transmission is formed between partitions, and also to a method for manufacturing the same.

BACKGROUND ART

Japanese Patent Laid-open Publication No. 2000-320502 discloses related art of a control valve body of an automatic transmission. According to this related art, a valve body member which has a hydraulic oil channel groove formed on at least one surface thereof and constituting a hydraulic circuit, and a cap member which is attached to the surface of the valve body member where the channel groove is formed and covers the channel groove, are provided. On the cap member, a supporting portion is formed, which has a side surface for supporting the partition between the channel grooves on the valve body member, against pressing pressure applied from an oil channel in the form of the channel groove. With this arrangement, the thickness of the partition formed on the valve body member, and accordingly the size and weight of the valve body member, can be reduced.

In addition to the above, Japanese Patent Laid-open Publication No. Hei 10-238628 discloses a control valve body of an automatic transmission. Further, as other background art, Japanese Patent No. 3286224 and Japanese Patent Laid-open Publication No. Hei 11-124692 disclose a magnesium-molded product.

A control valve body of an automatic transmission is generally manufactured through aluminum die-casting. A hydraulic oil channel groove defined on the valve body is formed using a steel casting mold. However, in an attempt to reduce the width of the channel groove in manufacturing the valve body through aluminum die-casting, the casting mold in use is readily deteriorated due to the reaction between the aluminum melted liquid and the steel casting mold and heat exhaustion or the like in a cooling and heating cycle. Therefore, it is not practicable to employ a valve body having a channel groove of a narrower width.

According to Japanese Patent Laid-open Publication No. 2000-320502, where size and weight reduction of the valve body is attempted by forming a thinner partition, a problem remains that sufficient size and weight reduction of the valve body cannot be readily achieved as employment of a channel groove having a narrower width is not practicable due to the above-described reason.

The present invention aims to provide a control valve body of an automatic transmission in which a hydraulic oil channel groove having a narrower width can be formed, and a method for manufacturing such a control valve body.

DISCLOSURE OF INVENTION

According to the present invention, there is provided a manufacturing method for manufacturing a control valve body of an automatic transmission where a channel groove for hydraulic oil for use in a speed change operation of the automatic transmission is formed between partitions, comprising a magnesium die-casting step of pouring, by means of pressure, melted liquid of magnesium or magnesium alloy into a hollow portion formed using a casting mold, to thereby mold a valve body having the partitions formed thereon, and in the magnesium die-casting step, the channel groove is formed due to a convex portion which is formed on the casting mold so as to project into the hollow portion.

According to the present invention, by pouring, by means of pressure, the melted liquid of magnesium or magnesium alloy into the hollow portion formed using a casting mold, a valve body where partitions for forming a hydraulic oil channel groove are formed is molded.

With the above, variation of the temperature of the mold during the cooling and heating cycle can be suppressed, and the reactivity between the melted liquid and the mold can be eliminated. Therefore, according to the present invention, the convex portion formed on the mold for formation of a channel groove is not deteriorated. This allows employment of a thinner convex portion, and accordingly, formation of a hydraulic oil channel groove having a narrower width.

In the method for manufacturing a control valve body of an automatic transmission according to the present invention, a piercing pin which projects into the hollow portion and pierces through the convex portion is provided on the casting mold, and in the magnesium die-casting step, a valve hole for allowing the valve to pierce through the partitions is formed by the piercing pin.

With this arrangement, it is possible to reduce the force (side force) which is perpendicular to the shaft of the valve and acts on the valve piercing through the partitions.

According to another aspect of the present invention, there is provided a control valve body of an automatic transmission where a channel groove for hydraulic oil which is used in a speed change operation of the automatic transmission is formed between partitions, wherein a valve body having the partitions formed thereon is made using magnesium or magnesium alloy.

According to the present invention, the valve body where partitions for forming a channel groove for hydraulic oil are formed is made using magnesium or magnesium alloy. This enables formation of a channel groove for hydraulic oil having a narrower width.

BEST MODE FOR CARRYING OUT THE INVENTION

In the following, a preferred embodiment of the present invention will be described with reference to the accompanied drawings.

Figure 1:
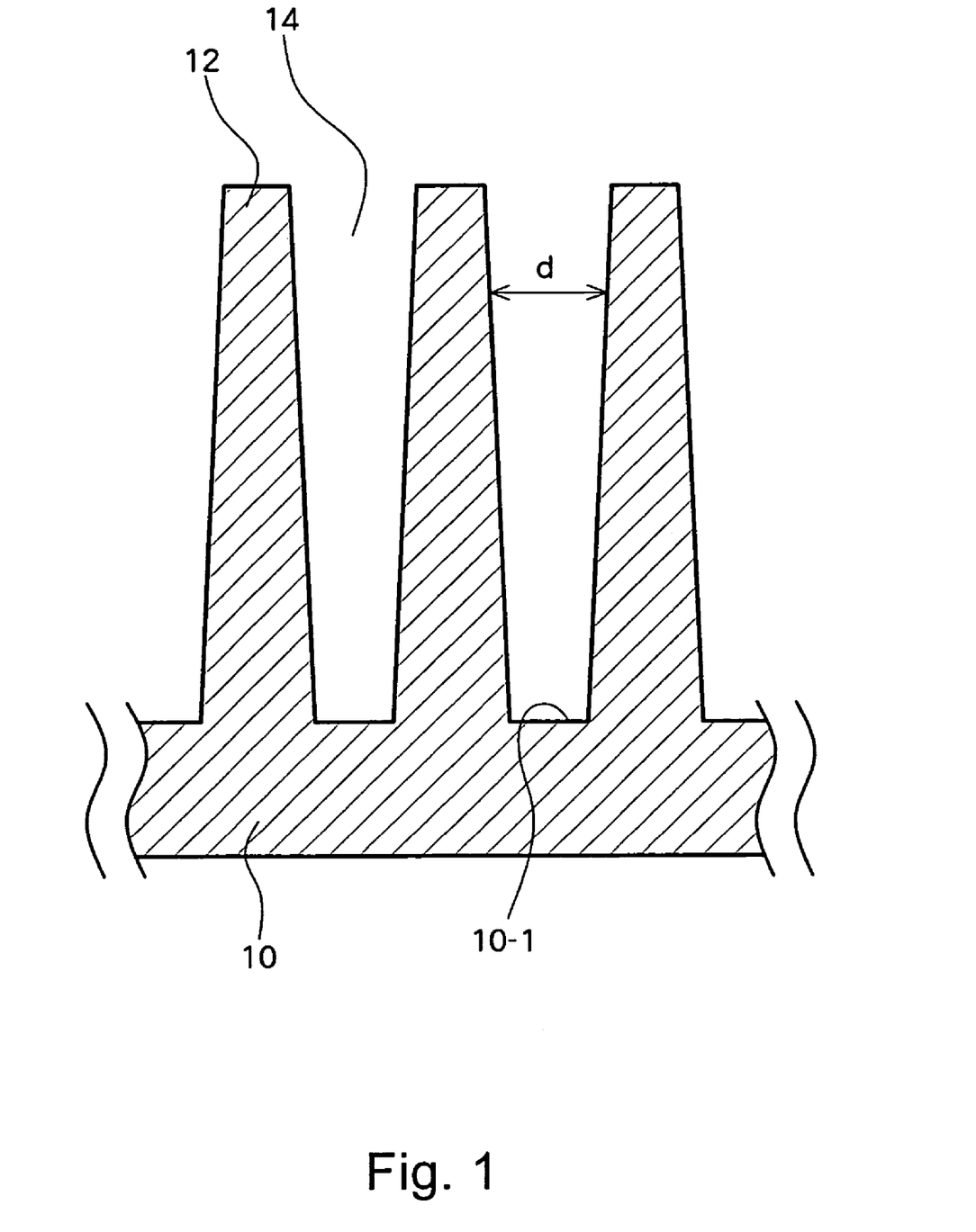
FIG. 1 is a cross sectional view schematically showing a structure of a control valve body of an automatic transmission according to an embodiment of the present invention.
Figure 2:
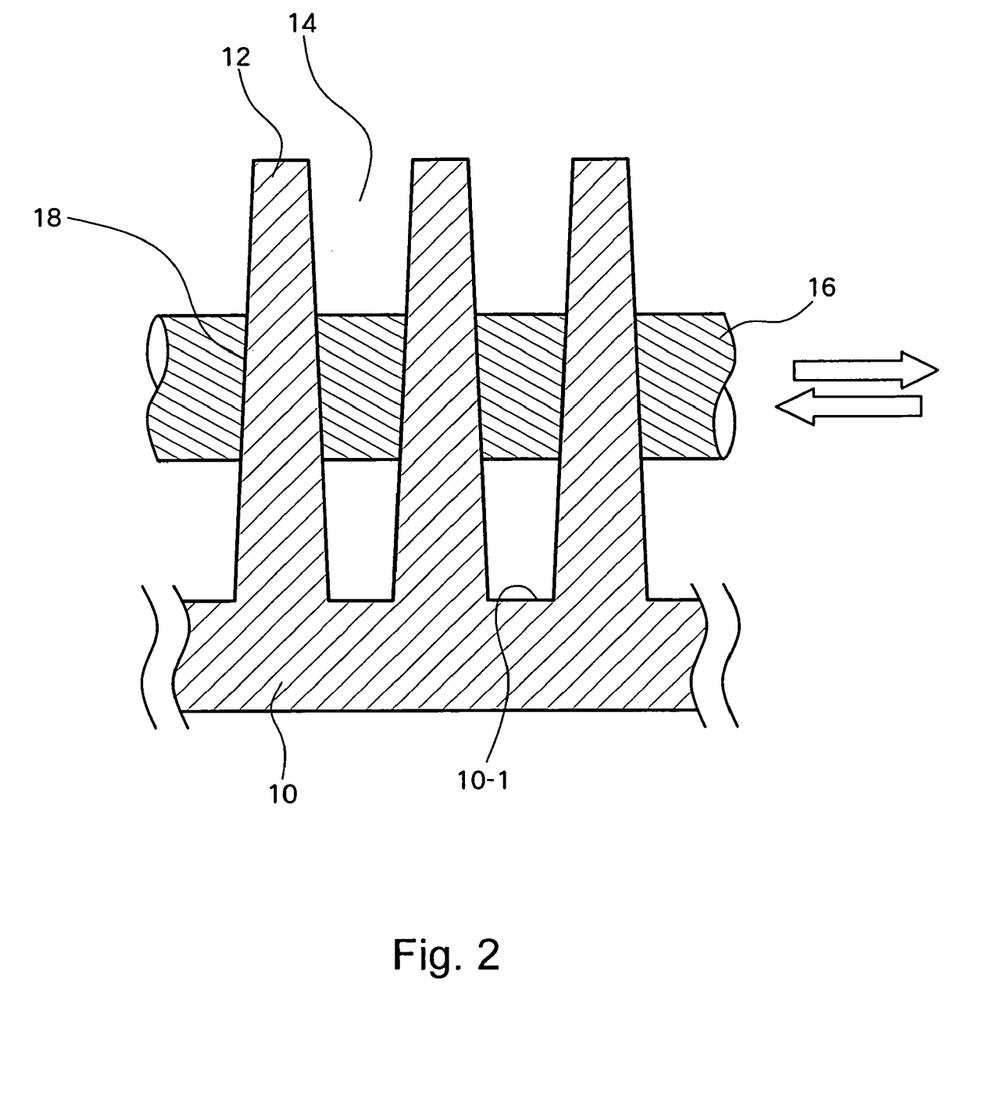
FIG. 2 is a cross sectional view schematically showing a structure of a control valve body of an automatic transmission according to the embodiment of the present invention.

FIGS. 1 and 2 are cross sectional views schematically showing a structure at different positions of a control valve body of an automatic transmission according to an embodiment of the present invention. A valve body 10 according to this embodiment has a plurality of partitions 12 formed on a base surface 10-1 of the valve body 10 thereof so as to project in a substantially vertical direction thereto, so that a channel groove 14 for hydraulic oil, which is used in a speed change operation of the automatic transmission, is defined between the partitions 12. It should be noted that FIGS. 1 and 2 show only a part of the valve body 10, and that the overall shape of the valve body 10, which can be realized in a known shape, is not shown. The valve body 10 according to this embodiment is used in a hydraulic control circuit for an automatic transmission such as a multi-speed AT, a CVT, or the like.

As shown in FIG. 2, a valve hole 18 is formed on some of the partitions 12, so that the valve 16 passes through the valve holes 18 to thereby pass through the partitions 12 in the substantially vertical direction. When the valve 16 slides in the substantially vertical direction relative to the partitions 12 (that is, the direction substantially parallel to the base surface 10-1 of the valve body 10), oil grooves for use in a speed change operation of the automatic transmission can be switched.

In this embodiment, the valve body 10 having the partitions 12 formed thereon is made using magnesium or magnesium alloy. As an example of magnesium alloy, AZ group (AZ91D and so forth), or AM group (AM60B an so forth) may be employed here. In addition, AS group (AS21 and so forth) having heat resistance imparted, or heat resistant alloy with Ca, Sr, RE (Ce, La, Pr, Nd), Sn or the like added thereto may also be applicable. Any alloy containing magnesium as a main component can be used as the material of the valve body 10 according to this embodiment.

In the following, a method for manufacturing the valve body 10 according to this embodiment will be described. The valve body 10 according to this embodiment can be manufactured through steps including a magnesium die-casting step.

Figure 3:
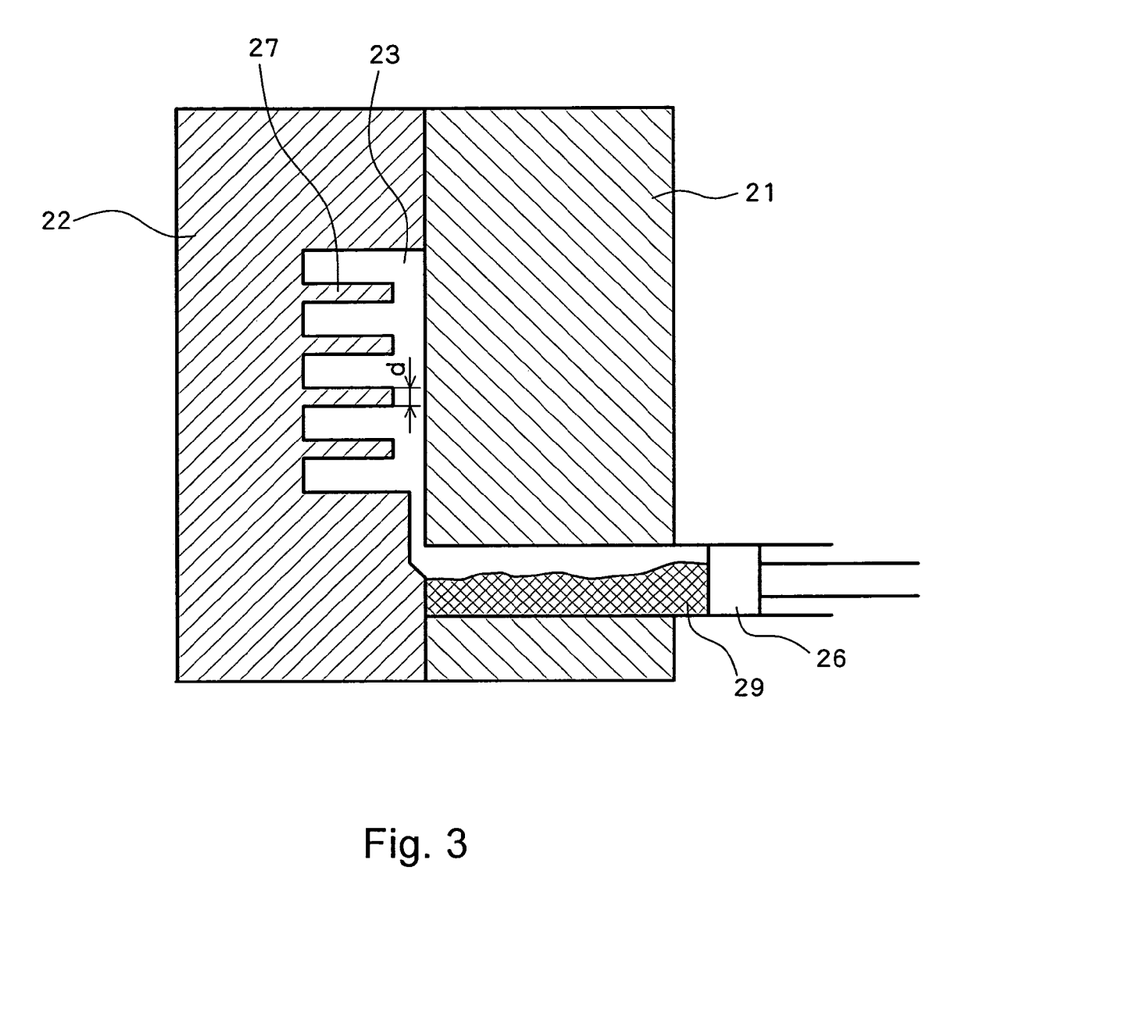
FIG. 3 is a cross sectional view schematically showing a structure of a magnesium die-casting device used in carrying out a method for manufacturing the control valve body of the automatic transmission according to the embodiment of the present invention.
Figure 4:
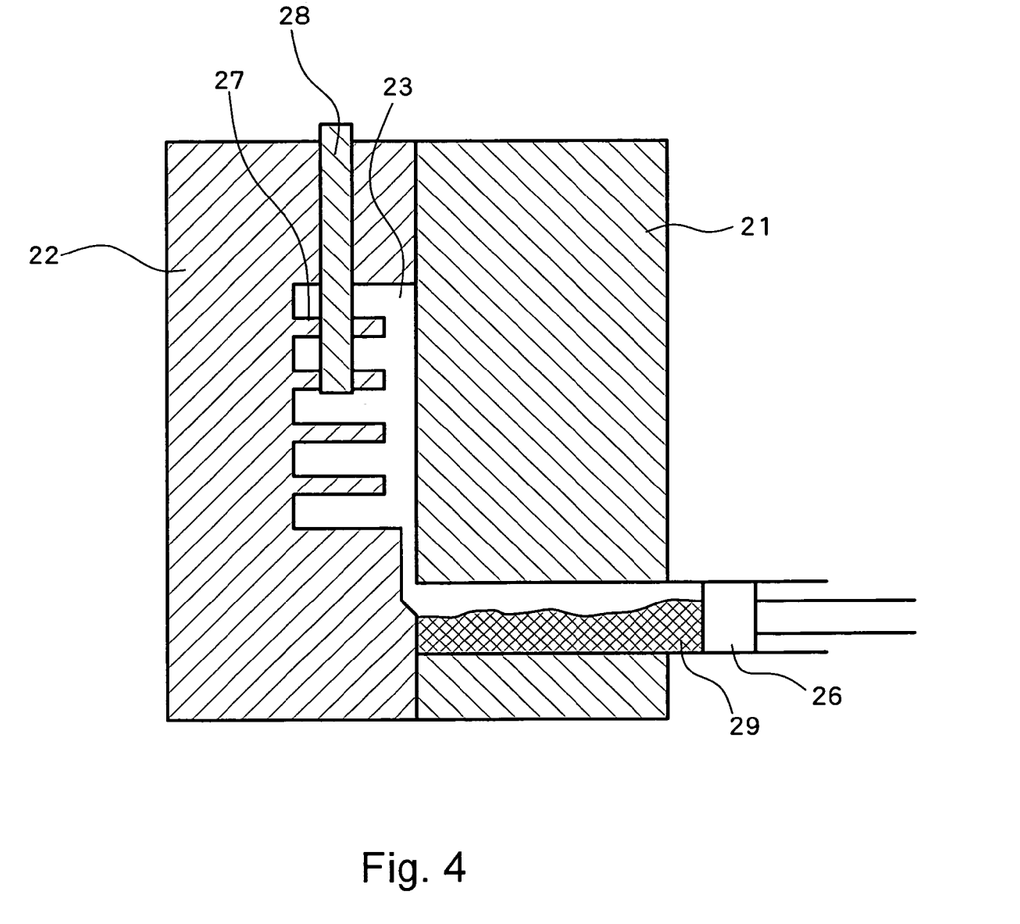
FIG. 4 is a cross sectional view schematically showing a structure of a magnesium die-casting device used in carrying out a method for manufacturing the control valve body of the automatic transmission according to the embodiment of the present invention.

FIGS. 3 and 4 are cross sectional views schematically showing a structure at different positions of a magnesium die-casting device which is used in carrying out a method for manufacturing the valve body 10 according to this embodiment. The die-casting device in this embodiment has a steel mold including a fixed side die 21 and a moving side die 22. The fixed side die 21 and the moving side die 22 together form a hollow portion 23 for molding the valve body 10.

A plurality of convex portions 27 are formed on the moving side die 22, which project into the hollow portion 23. Further, as shown in FIG. 4, a moving pin 28 is provided to the moving side die 22, which projects into the hollow portion 23 while piercing through some of the convex portions 27 in the substantially vertical direction.

In the magnesium die-casting step, the melted liquid 29 of magnesium or magnesium alloy is poured into the hollow portion 23 by means of pressure from the plunger 26 for molding the valve body 10. In the molding, the channel groove 14 is formed due to the convex portion 27, and the melted liquid 29 poured into the space between the convex portions 27 forms the partition 12. The valve hole 18 is formed due to the moving pin 28. It should be noted that as the melted liquid 29 of magnesium alloy, the melted liquid 29 of the above described materials may be employed.

After the melted liquid 29 having been poured into the hollow portion 23 by means of pressure is consolidated through cooling, the moving pin 28 is pulled out from the moving side die 22, and the moving side die 22 is moved to thereby release the hollow portion 23. Then, known machining is carried out on the valve body 10 which is molded through magnesium die-casting. Through the above-described steps, the valve body 10 according to this embodiment can be manufactured.

Here, a case in which the valve body 10 is molded through aluminum die-casting is considered. In this case, due to the large heat capacity of the aluminum, the temperature of the dies 21, 22 may vary largely in a cooling and heating cycle. Further, the reaction between the melted aluminum liquid and the steel dies 21, 22 readily leads to formation of reactant on the surface of the dies 21, 22. As a result, the dies 21, 22 (in particular, the convex portion 27 thereof) are readily deteriorated. Therefore, in the case where the valve body 10 is molded through aluminum die-casting, a die 22 having thinner convex portions 27 formed thereon is not appropriately employed. This makes it difficult to form a valve body 10 having a channel groove 14 with a narrower width.

Meanwhile, in this embodiment, magnesium die-casting is employed in molding of the valve body 10 having partitions 12 formed thereon. As magnesium has a smaller heat capacity than aluminum, the variation of the temperature of the dies 21, 22 in the cooling and heating cycle can be suppressed. Moreover, as the melted magnesium liquid 29 has no reactivity with respect to the steel dies 21, 22, deterioration of the dies 21, 22, in particular, of the convex portion 27 thereof, can be suppressed. Therefore, according to this embodiment, as the convex portion 27 is not deteriorated, a thinner convex portion 27 can be employed. This enables formation of a valve body 10 having a channel groove 14 having a narrower width d, and therefore, size reduction of the valve body 10 can be achieved. It should be noted that, in this embodiment, typically, the width d of the channel groove 14 can be reduced to smaller than 3 mm.

Further, in this embodiment, the use of magnesium, which has smaller relative density than aluminum, as the material of the valve body 10 enables reduction of the weight of the valve body 10.

Figure 5:
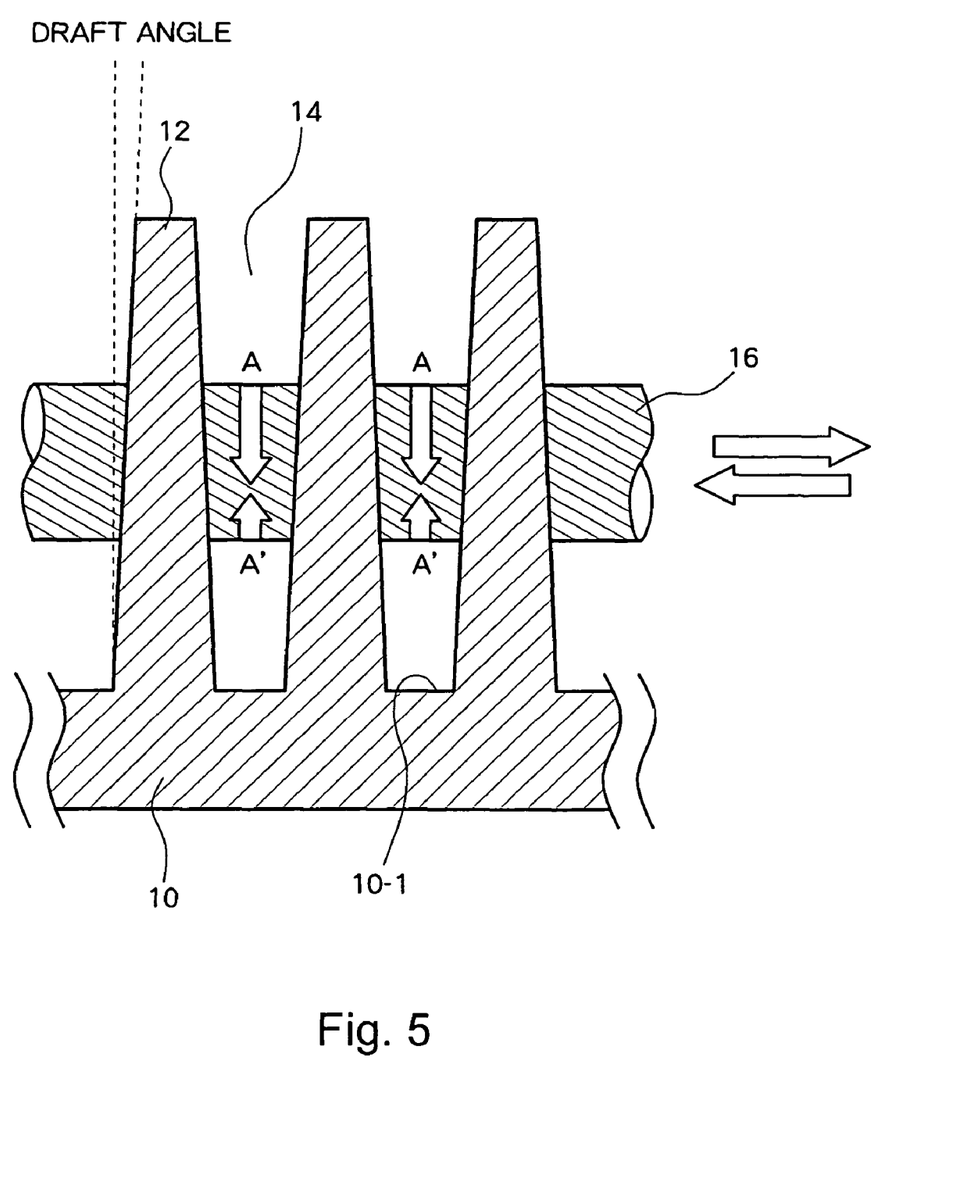
FIG. 5 is a cross sectional view explaining a side force applied to the valve.

In addition, in the case where the valve body 10 is molded through aluminum die-casting, it is difficult to ensure a smaller draft angle due to the reactivity between the aluminum melted liquid and the steel dies 21, 22. Specifically, when there is a draft angle defined on the partition 12, as shown in FIG. 5, the width of the channel groove 14 becomes wider as it goes away from the base surface 10-1 of the valve body 10. In this case, in consideration of the force (a side force) which is perpendicular to the shaft of the valve 16 and acts on the valve 16 due to the pressure of the hydraulic oil having been poured into the channel groove 14, the side force A due to the pressure by the hydraulic oil near the tip end side of the partition 12 (upper in FIG. 5) is larger than the side force A' due to the pressure of the hydraulic oil near the base surface side 10-1 (lower in FIG. 5). In other words, a side force which is directed from the tip end side of the partition 12 toward the base surface 10-1 side thereof acts on the valve 16. This side force causes the friction of the valve 16 to increase, leading to deterioration of the oil groove switching capability.

Meanwhile, in this embodiment, as the valve body 10 having partitions 12 formed thereon is molded through magnesium die-casting, the reactivity between the magnesium melted liquid 29 and the steel dies 21, 22 can be eliminated. This makes it possible to ensure a smaller draft angle of the partition 12. As a result, the channel groove 14 having constant widths on the tip end side of the partition 12 and the base surface 10-1 side can be formed. This makes it possible to reduce the above-described side force which acts on the valve 16. Therefore, in this embodiment, the friction of the valve 16 can be reduced, and the oil groove switching capability can be enhanced. It should be noted that in this embodiment, typically, the draft angle of the partition 12 can be reduced to smaller than two degrees.

Further, in this embodiment, beside realization of a smaller draft angle, molding of the valve 10 through magnesium die-casting enables reduction of consumption of the mold release agent.

It should be noted that, although an embodiment to render the present invention into practice has been described in the above, the present invention is not limited to such an embodiment, and that a variety of modifications can be made to the present invention within the scope and gist of the present invention.

The invention claimed is:

1. A method for manufacturing a control valve body of an automatic transmission for use in a speed change operation of the automatic transmission, comprising:
   providing a mold having a fixed side die and a moving side die, the moving side die having at least one projecting portion;
   bringing the moving side die in contact with the fixed side die, and forming a casting mold having a hollow portion between the moving side die and the fixed side die, the at least one projecting portion protruding into the hollow portion;
   pressure injecting melted liquid magnesium or magnesium alloy into the hollow portion using a plunger;
   cooling the liquid magnesium or magnesium alloy in the casting mold to thereby mold a valve body having partitions with a draft angle less than two degrees a valve hole through which a valve passes being formed on the partitions, and a channel groove for hydraulic oil between the partitions, the channel groove being formed by the at least one projecting portion and the channel groove having a width of less than 3 mm; and
   moving the moving side die away from the fixed side die to release the valve body.

2. The method for manufacturing a control valve body of an automatic transmission according to claim 1, further comprising:
   providing a piercing pin through the moving side die, the piercing pin projecting into the hollow portion;
   passing the piercing pin through the at least one projecting portion; and
   removing the piercing pin from the moving side die after cooling the liquid magnesium or magnesium alloy in the casting mold, thereby forming the valve hole through at least one of the partitions.

* * * * *

UNITED STATES PATENT AND TRADEMARK OFFICE
CERTIFICATE OF CORRECTION

PATENT NO.       : 7,854,250 B2
APPLICATION NO.  : 11/596845
DATED            : December 21, 2010
INVENTOR(S)      : Toshihiro Aoyama et al.

It is certified that error appears in the above-identified patent and that said Letters Patent is hereby corrected as shown below:

Claim 1, col. 6, line 5, insert --,-- after "two degrees".

Signed and Sealed this
Twenty-second Day of March, 2011

David J. Kappos
*Director of the United States Patent and Trademark Office*